O. H. GRUPE.
TWO-SPEED DIRECT DRIVE TRANSMISSION MECHANISM.
APPLICATION FILED MAR. 14, 1916.

1,234,462.

Patented July 24, 1917.
3 SHEETS—SHEET 1.

Inventor
O. H. Grupe.
By
Attorneys.

O. H. GRUPE.
TWO-SPEED DIRECT DRIVE TRANSMISSION MECHANISM.
APPLICATION FILED MAR. 14, 1916.

1,234,462. Patented July 24, 1917.
3 SHEETS—SHEET 2.

Inventor
O. H. Grupe.
By
[signature], Attorneys

Inventor
O. H. Grupe.

UNITED STATES PATENT OFFICE.

OTTO H. GRUPE, OF SILOAM SPRINGS, ARKANSAS.

TWO-SPEED DIRECT-DRIVE TRANSMISSION MECHANISM.

1,234,462.  Specification of Letters Patent.  Patented July 24, 1917.

Application filed March 14, 1916. Serial No. 84,125.

*To all whom it may concern:*

Be it known that I, OTTO H. GRUPE, a citizen of the United States, residing at Siloam Springs, in the county of Benton and State of Arkansas, have invented certain new and useful Improvements in Two-Speed Direct-Drive Transmission Mechanisms, of which the following is a specification.

My invention relates to new and useful improvements in transmission mechanism, the primary object of my invention being the provision of an improved two speed direct drive transmission mechanism capable of being employed for transmitting power under all circumstances when a two speed transmission mechanism is desirable but particularly adapted for use upon self-propelled vehicles.

A still further object of my invention is the provision of a transmission mechanism of the above described character in which the power is transmitted wholly through beveled gears and pinions, all of the beveled gears being connected either directly or indirectly with the differential cage of the rear axle and all of the pinions being permanently keyed upon the drive shaft of the vehicle.

A still further object of my invention consists in the provision of clutches movable into and out of locking engagement with clutch members formed upon the beveled gears of the transmission mechanism and in the provision of a novel and effective means for operating the clutches by a single lever to selectively move the transmission mechanism into position to transmit power at either of its calculated speeds or to a neutral position.

In this connection, a still further object of my invention consists in so constructing the differential cage and in arranging the clutch member by means of which one of the beveled gears is connected to the differential cage that such movable clutch member will, at all times, revolve with the differential cage although in no way keyed to it.

A yet further object of my invention consists in the provision of a novel form of differential mechanism and an extremely simple and effective means for mounting the beveled pinions of such mechanism in their cage.

With these and other objects in view, my invention will be more fully described, illustrated in the accompanying drawings, and then specifically pointed out in the claims which are attached to and form a part of this application.

In the drawings.

Corresponding and like parts are referred to in the following description and indicated in all the views of the drawings by the same reference characters.

Figure 1:
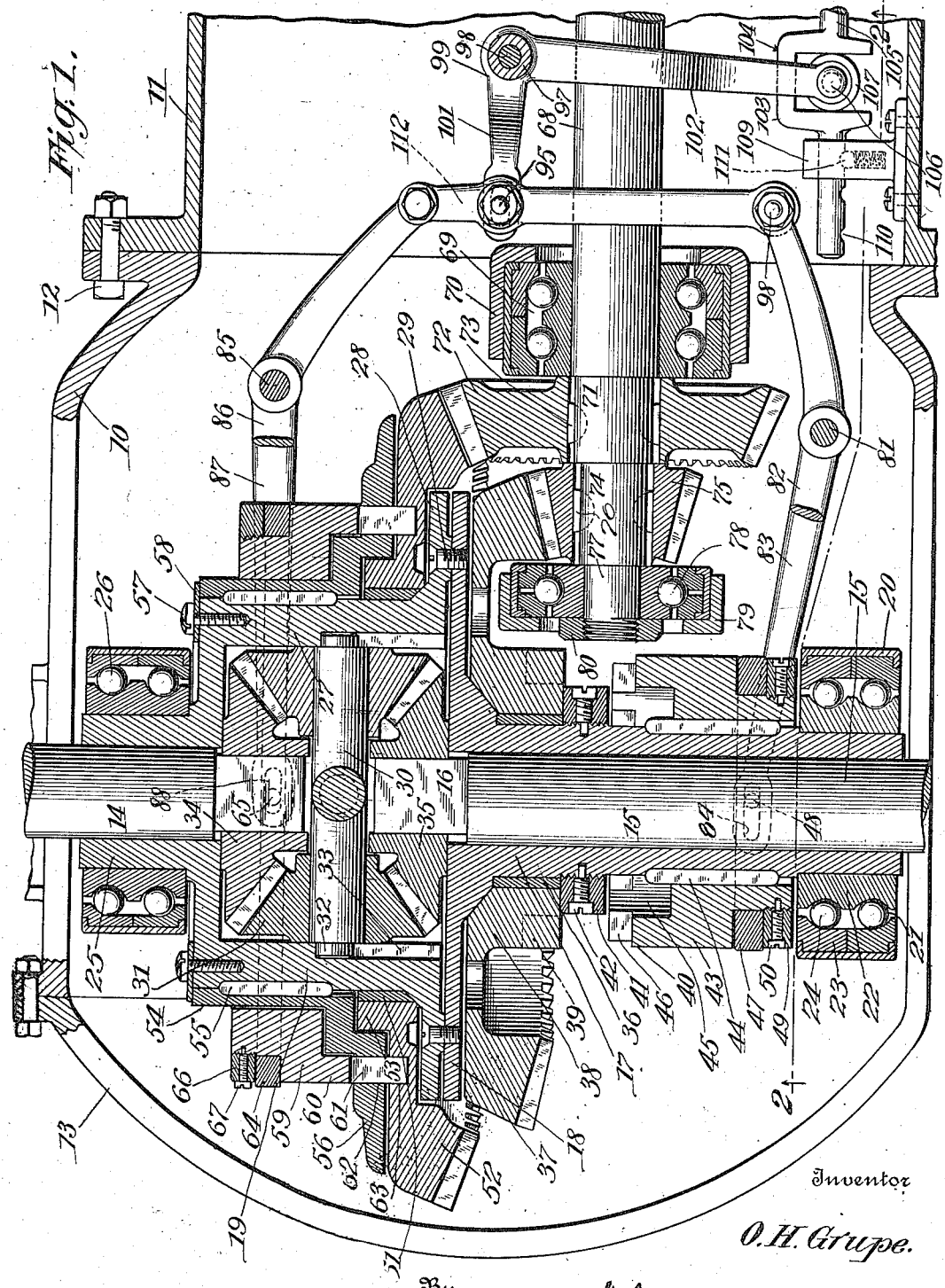
Figure 1 is a horizontal sectional view taken through the transmission mechanism and its coöperating differential mechanism.
Figure 2:
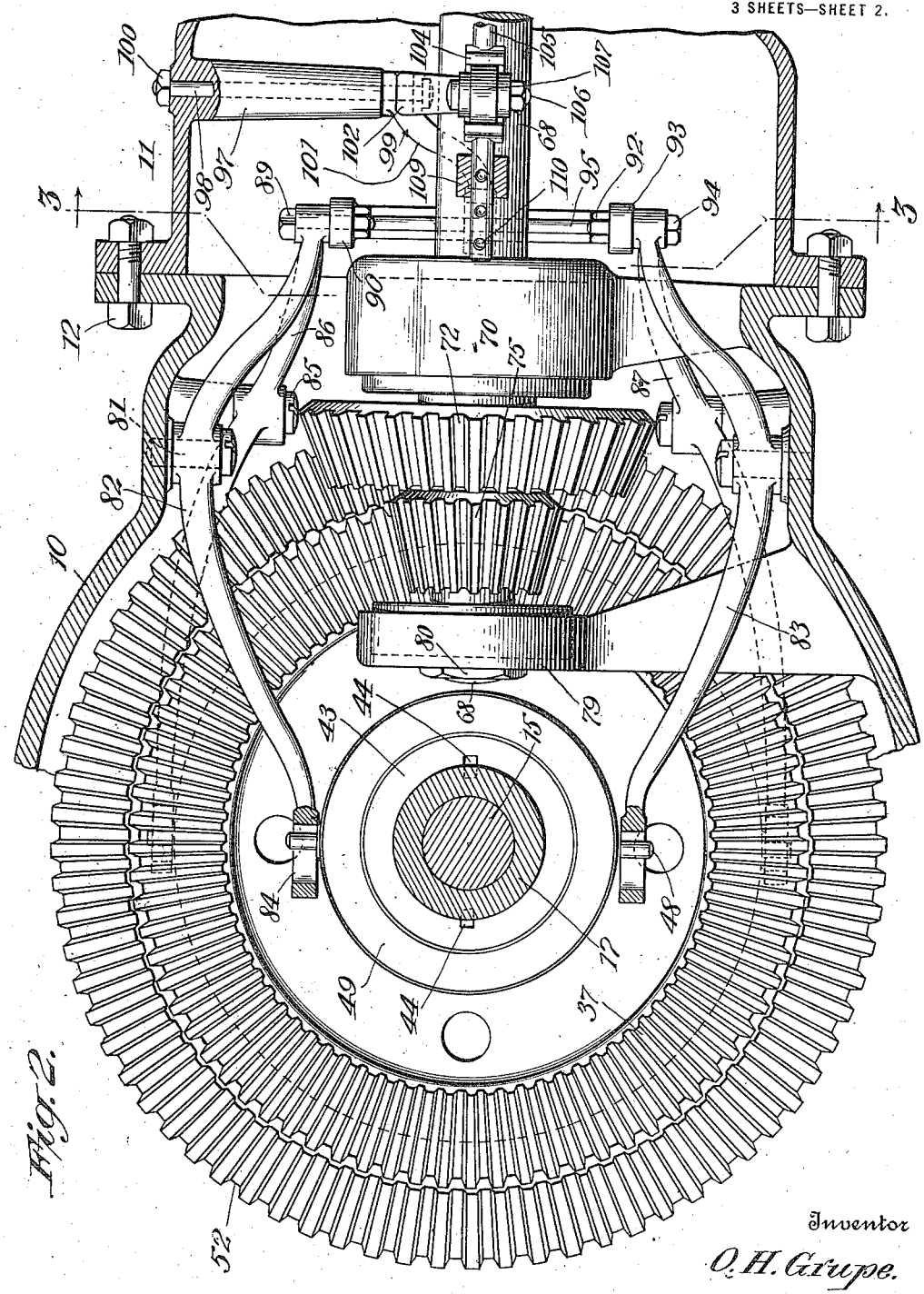
Fig. 2 is a vertical sectional view taken on the line 2—2 of Fig. 1.

Although my improved transmission mechanism may be employed for other purposes than the transmission of power to motor vehicles, under which circumstances, of course, a differential mechanism will not be necessary, I have illustrated it in connection with the rear axle of a motor vehicle. The preferred embodiment of my improved transmission mechanism comprises part of the rear axle assembly or unit and is inclosed principally in rear and forward transmission housings 10 and 11 which communicate with each other and having mating flanges through which are passed bolts 12 to secure them together. The rear housing member 10 is greatly similar to the ordinary differential mechanism housing with the exception that it is larger, being open at its sides and otherwise adapted for attachment to the rear axle housings, not shown, and being closed at its end by a cover plate 13 which permits access both to the transmission mechanism and differential mechanism inclosed in the housing.

The live axle sections 14 and 15 of the rear axle extend through the sides of this housing in longitudinal alinement with each other and have squared inner terminals 16 which are held in slightly spaced relation to each other as is customary in motor vehicle construction. A bearing sleeve 17 surrounds the live axle section 15 within the housing and terminates at its inner end, adjacent the squared end of the axle section 15, in a relatively wide peripherally extending flange 18 which forms one wall of the differential housing or cage, indicated as a whole by the numeral 19. Any suitable form of bracket, not shown, extends from the transmission housing 10 and supports the outer cage 20 of a bearing 21 which includes the inner bearing member 22 fixed about the outer end of the sleeve 17 and the compound outer bearing member 23, the inner faces of the bearing members 22 and 23 being channeled to seat ball bearings 24. Obviously, this bearing member 21 may be constructed to operate with roller or other suitable bearings instead of the ball bearings, if preferred.

In like manner, a sleeve 25 surrounds the inner portion of the live axle section 14 and is journaled by a bearing member 26, corresponding to the bearing member 21 and similarly supported by a bracket, not shown. This sleeve 25 is formed at its inner end with a hollow cylindrical head 27 which provides the opposite face and peripheral wall of the differential cage 19 and which terminates at its free edge in a peripherally extending flange 28 which abuts against the outer portion of the peripheral flange 18 of the sleeve 17 to which it is secured by a plurality of screws 29.

Figure 4:
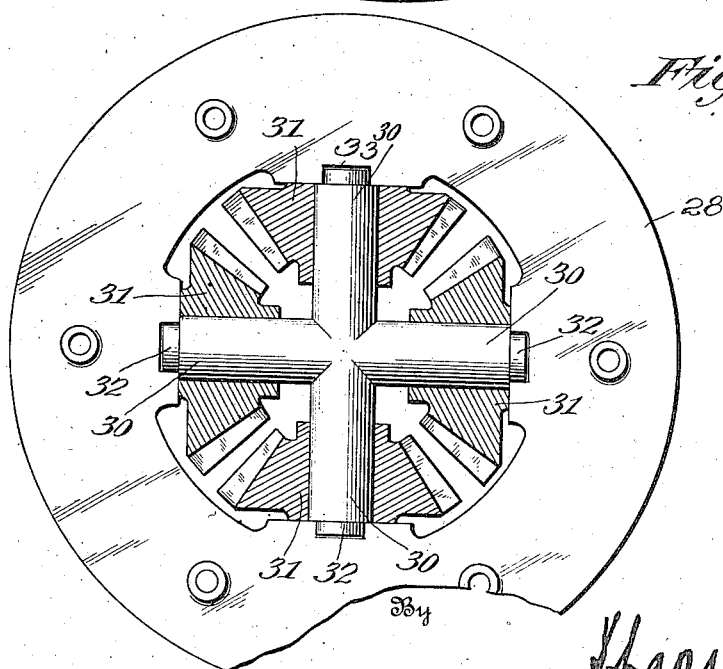
Fig. 4 is an elevation of the differential cage showing the beveled pinions therein in section, the beveled gears which coöperate with the rear axle sections not being shown.

The differential mechanism proper, which is inclosed in the cage 19, is a cross-shaped member 30, best shown in Fig. 4 as having cylindrical arms which form the idler shafts for the differential pinions 31, these pinions being mounted for free rotation about the arms of the cross. The free ends of the cross arms extend beyond the outer faces of the pinions and are reduced, as shown at 32, in order that they may be slipped into longitudinally extending slots 33 formed in the inner face of the cylindrical head portion of the sleeve 25. These pinions all mesh with the beveled gears 34 and 35 which are mounted upon the squared inner ends of the live axle sections 14 and 15. It will, therefore, be seen that whenever the cage 19 is rotated, power will be transmitted to the live axle sections through the pinions 31 and beveled gears 34 and 35, the relative rates of rotation of the axle sections depending, of course, upon the loads under which they are operating.

Immediately adjacent the flange 18 of the sleeve 17, the sleeve is surrounded by a rotatable bushing or bearing ring 36 upon which is mounted the beveled gear 37 which constitutes the low speed gear of my transmission mechanism, as will be later explained. This beveled gear has an outwardly directed hub 38, into which the bushing is tightly driven, formed with a series of peripherally spaced squared sockets 39 which constitute one member of a clutch, indicated as a whole by the numeral 40. This beveled gear 37 is, therefore, fixed upon its bushing 36 and is held against longitudinal movement along the sleeve 17 by a stop collar 41 which is threaded upon the sleeve to engage loosely against the hub of the gear and which, in adjusted position, is secured by a plurality of set screws 42. Secured about the sleeve 17 is a clutch collar 43 which constitutes the second member of the clutch 40 and which is secured to the sleeve by one or more keys 44 in such a manner that it will turn with the sleeve and yet be movable longitudinally thereof. This clutch collar is recessed, as shown at 45, in order that its inner edge portion may pass the stop collar 41 and such edge portion is notched to provide a series of squared clutch teeth 46 adapted to seat in the sockets or recesses 39 of the hub of the gear 37. A shifter collar 47 is mounted for idle turning movement about the reduced outer end of the clutch collar 43 and is provided at oppositely disposed points with outwardly directed trunnions 48 for engagement by shipper levers, as will be later explained. This shifter collar is held from disengagement from the clutch collar 43 by a stop collar 49, corresponding to the stop collar 41 and having threaded engagement about the reduced end of the clutch collar 43, being secured in adjusted position by set screws 50.

Surrounding that part of the head portion of the differential cage 19, adjacent the flange 28, is a second bushing 51 which is tightly driven into the hub of the larger beveled gear 52 which constitutes the high speed beveled gear of my transmission mechanism and which is provided at its outer face with a thickened hub portion 53. A combined gear and clutch retaining member 54 is mounted about the outer portion of the differential cage 19, being secured to the cage by keys 55, in the manner shown in Fig. 1. This member 54 has its inner face recessed to receive the hub 53 of the gear 52 and is formed with an outwardly directed peripheral flange 56 which extends in spaced relation to the outer face of the beveled gear 52. A plurality of screws 57 are passed through washers 58 and threaded into the outer end of the cylindrical head portion 27 of the differential cage in such a manner that the peripheral edges of the washers 58 extend over the ends of the member 54 and hold it against longitudinal movement with respect to the differential cage.

Surrounding the combined gear and clutch retaining member 54, is a clutch collar 59 having an inwardly extending peripheral flange 60 notched at spaced intervals to provide squared clutch teeth 61 which, in all positions of the clutch collar 59, extend into squared openings 62 formed in the flange portion 56 of the member 54. These clutch teeth 61 are, however, of such length that in the innermost position of the clutch collar 59 they will also seat in squared sockets 63 formed in the rear face of the beveled gear 52 and, therefore, serve to lock the beveled gear to the clutch and gear retaining member 54 and, consequently, to the differential cage 19. The outer end of the clutch collar 59 is reduced to receive a shifter collar 64 formed at opposite points with outwardly directed trunnions 65 for coöperation with shipper levers and held against displacement by a stop collar 66 having threaded engagement upon the outer end of the clutch collar 59 and held in adjusted position by set screws 67.
The drive shaft 68, leading from the engine or other suitable source of power, extends through the housing 11 and into the housing 10 in the usual manner and near its point of entry into the housing 10 is journaled in a bearing 69 corresponding to the bearings 21 and 26 and supported by a bracket 70 either formed integrally with or carried by the transmission housing 10. This drive shaft 68, immediately at the rear of the bearing 69, is slightly reduced, as shown at 71, to receive the beveled pinion 72 which meshes with the beveled gear 52 and which is secured to the drive shaft by one or more keys 73. Immediately at the rear of this reduced portion 71, the shaft is further reduced at 74 to receive the beveled pinion 75 which meshes with the beveled gear 37 and which is secured to the drive shaft by one or more keys 76. At the rear of the reduced portion 74, the shaft is still further reduced, as shown at 77 and journaled in a bearing 78, corresponding to the bearing 69 and carried by a bracket 79, corresponding to the bracket 70. The extreme rear end of the shaft 68 is threaded to receive a lock nut 80 by means of which the shaft is held against any longitudinal movement through its bearings 69 and 78.

From the foregoing description, it will be apparent that when the shaft 68 is rotated, both of the beveled pinions 72 and 75 will be rotated and that, as a consequence, both of the beveled gears 37 and 52 will be rotated. As a result, power will be transmitted from the shaft 68 to the differential cage through whichever of the beveled gears 37 and 52 is engaged by its clutch. As a means for selectively and simultaneously operating the clutch collars 43 and 59, I provide a control mechanism which will now be explained. Pivot bolts 81, threaded into the upper and lower walls of the transmission housing member 10, are passed through the intermediate portions of upper and lower shipper levers 82 and 83, respectively, which, at their rear ends, are formed with slots 84 to receive the upper and lower trunnions 48 of the shifter collar 47. In like manner, pivot bolts 85 are threaded into the upper and lower walls of the housing section 10 and passed through intermediate portions of upper and lower shipper levers 86 and 87 which, at their rear ends, are slotted, as shown at 88 in Fig. 1 to receive the trunnions 65 of the shifter collar 64 of the clutch collar 59. Bolts 89 are passed through the forward ends of the upper shipper levers 82 and 86 and through the ends of a transversely extending link 90 and secured by nuts 91, whereby the shipper levers are connected by simultaneous swinging movement. In like manner, bolts 92 are passed through the forward ends of the lower shipper levers 83 and 87 and through the ends of a link 93 and secured by nuts 94 so that the lower shipper levers are connected to swing in unison. One of these links is disposed above and the other below the drive shaft 68 and adjacent one end the links are connected by a tie bolt 95 secured by a nut 96. Because of this, it will be apparent that all of the shipper levers will swing in unison.

Figure 3:
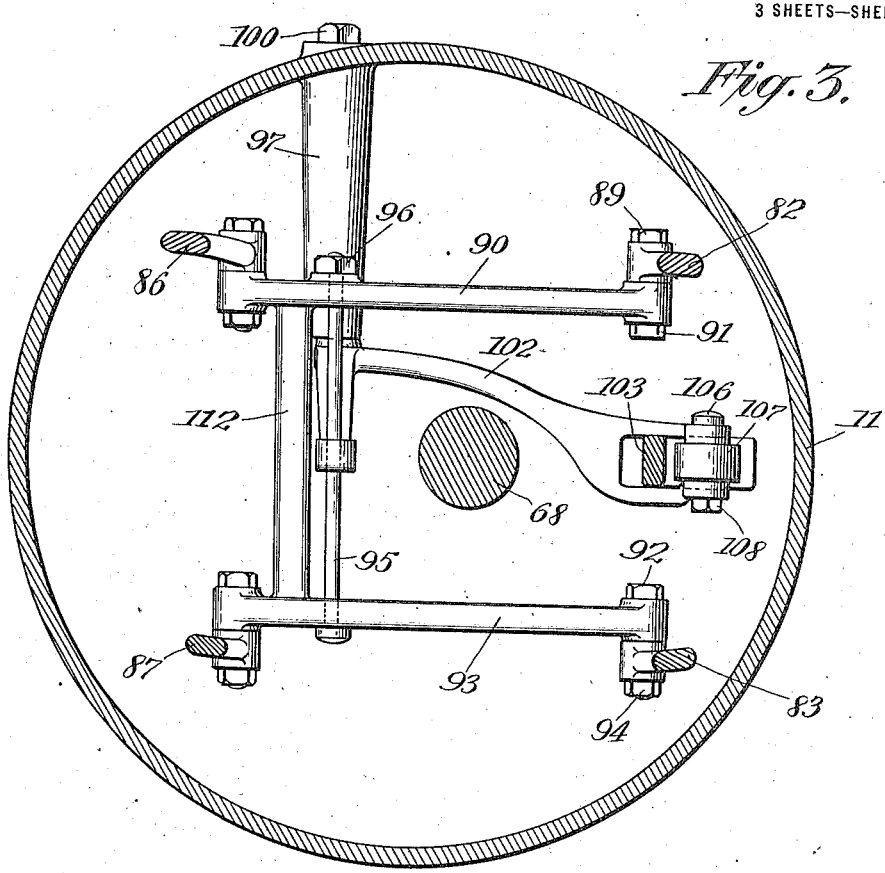
Fig. 3 is a transverse vertical sectional view taken on the line 3—3 of Fig. 2.

In advance of the links 90 and 93, the upper wall of the housing section 11 is formed with a downwardly directed stud or boss 97 through which extends a tie bolt 98 which also passes through the intermediate portion of a bell crank lever 99, the tie bolt being secured in place by a nut 100. One arm 101 of the bell crank lever 99 is curved downwardly and rearwardly and slotted to receive the intermediate portion of the tie bolt 95, whereby swinging of the bell crank lever will cause a transverse movement of the links 90 and 93 and simultaneous swinging of the various shipper levers. The other arm 102 of the bell crank lever is curved laterally and downwardly to clear the drive shaft 68, as best shown in Fig. 3 and at its free end is bifurcated to straddle the intermediate portion 103 of a U-shaped frame 104 formed intermediate the length of a shifter rod 105. A bolt 106 has its shank passed through the terminals of the fingers formed by bifurcating the lever arm 102 and journals a roller 107 which engages peripherally against the inner faces of the sides of the frame 104, the bolt being secured by a nut 108. Obviously, any forward or rearward reciprocation of the shifter rod 105 will cause a swinging of the bell crank lever 99 and, consequently, of the shipper levers. The rear end of the rod 105 extends but a slight distance beyond the frame 104 and is slidably mounted in a bore formed in a bracket 109 carried by the housing section 11. This rear portion of the rod is provided with a plurality of alined notches or seats 110 to seat a spring pressed pawl 111 carried by the bracket 109 which serves to frictionally hold the rod 105 in any one of three positions, there being three notches or seats provided. If deemed advisable for the sake of added rigidity, the links 90 and 93 may be connected by an integrally formed brace 112, as well as by the tie bolt 95.

From the foregoing description, taken in connection with the drawings, the operation of my improved two speed direct drive transmission mechanism will be readily understood. Assuming that the transmission mechanism is in neutral position, the ball check 111 will seat in the intermediate notch 110, the rod 105 being in a slightly advanced position from that shown in Fig. 1 and the links 90 and 93, as a result, being swung somewhat toward the right hand side of the housing 10. Under these circumstances, the teeth 46 of the clutch collar 43 will be advanced to a point nearly adjacent the hub 38 of the beveled gear 37, while the teeth 61 of the clutch collar 59 will be withdrawn from the sockets or seats 63 of the beveled gear 52. It will, therefore, be clear that neither of the beveled gears 37 and 52 will be locked to the differential housing or the sleeve 17 forming a portion of such housing. If the control rod 105 is moved forwardly until the check ball 111 seats in the rearmost notch 110, the links 90 and 93 will be swung farther to the right, with the result that the teeth 46 of the clutch collar 43 will seat in the sockets 39 of the hub of the beveled gear 37, while the teeth 61 of the clutch collar 59 will be withdrawn almost out of the openings 62 of the clutch and gear retaining member 54. Under these circumstances, the beveled gear 37 will be locked to the sleeve 17 and, consequently, to the differential cage 19, with the result that power will be transmitted from the drive shaft 68 through the beveled pinion 75 and beveled gear 39 to the differential cage and, consequently, through the differential mechanism to the rear axle sections, this being the low speed drive. If, after the vehicle has attained sufficient headway, the rod 105 is moved to its full extent in the opposite direction, the gears will be first brought to the neutral position, above described, and will then be brought to the position shown in Fig. 1, in which the clutch collar 43 is out of engagement with its beveled gear 37, while the clutch collar 59 is in engagement with the beveled gear 52 to lock it to the differential cage. Under these conditions, power will be transmitted from the drive shaft 68 through the beveled pinion 72 and beveled gear 52 to the differential cage and, consequently, to the rear axle sections which constitutes the high speed drive of the transmission mechanism.

It may, of course, be found desirable to make some slight changes in the details of construction and arrangement of parts, such, however, as will not in any way affect or change the principles of operation of my transmission mechanism and I therefore reserve the right to make any changes which may fall within the scope of the appended claims.

Having thus described the invention, what is claimed as new is:

1. A transmission mechanism including a drive shaft, beveled pinions fixed to the drive shaft, a differential gearing cage, beveled gears idly mounted about the cage and each meshing with one of the beveled pinions, and means for selectively locking the beveled gears to the cage, said means including clutch members movable into and out of operative engagement with the beveled gears, shipper levers operatively engaging the clutch members, a link connecting the free ends of the shipper levers, a bell crank lever pivoted by one arm to the link, a reciprocally mounted control rod, and means operatively engaging between the control rod and free arm of the bell crank lever.

2. A transmission mechanism including a drive shaft, a beveled pinion on the drive shaft, a differential gearing cage, a beveled gear rotatably mounted about the cage and meshing with the beveled pinion, the beveled gear in its outer face being formed with recesses, a member fixed about and to the cage and having a flange extending in spaced relation to the beveled gear formed with openings alining with the recesses of the beveled gear, and a clutch member slidable upon the first member and having clutch teeth extending into the openings of the first member and adapted, in one position of the clutch member, to engage in the recesses of the beveled gear.

3. In a transmission mechanism, a drive shaft, a differential gearing cage, a gear rotatably mounted about the cage but held against longitudinal movement thereon, a pinion fixed to the drive shaft and meshing with the gear, a bearing member fixed to the cage to rotate therewith, said bearing member having a flange formed with openings adapted in certain positions to aline with sockets formed in the gear, and a clutch collar freely mounted about the bearing member and having teeth projecting into the opening thereof and projectable into the sockets of the gear.

4. A transmission mechanism including a drive shaft, beveled pinions fixed to the drive shaft, a differential gearing cage, beveled gears idly mounted to rotate about the cage, clutch members having keyed connection with the cage and each being movable toward the other to engage its adjacent gear and lock it to the cage, and means for simultaneously swinging the clutch members in the same direction whereby movement of one clutch member to active position will move the other clutch member to inactive position.

5. A transmission mechanism including a drive shaft, beveled pinions fixed to the drive shaft, a differential gearing cage, beveled gears idly mounted to rotate about the cage, clutch members having keyed connection with the cage and each being movable toward the other to engage its adjacent gear and lock it to the cage, and means for simultaneously swinging the clutch members in the same direction whereby movement of one clutch member to active position will move the other clutch member to inactive position, said means including pivoted shipper levers operatively engaging the clutch members, connecting means between the shipper levers for swinging them in unison, and means for actuating the shipper levers.

6. A transmission mechanism including a drive shaft, beveled pinions fixed to the drive shaft, a differential gearing cage, beveled gears idly mounted to rotate about the cage, clutch members having keyed connection with the cage and each being movable toward the other to engage its adjacent gear and lock it to the cage, and means for simultaneously swinging the clutch members in the same direction whereby movement of one clutch member to active position will move the other clutch member to inactive position, said means including pivoted shipper levers operatively engaging the clutch members, connecting means between the shipper levers for swinging them in unison, means for actuating the shipper levers, a pivoted bell crank lever having operative connection with the shipper lever connecting means, a roller carried by the free end of the lever, and a reciprocally mounted control rod formed with a seat to receive the roller whereby reciprocation of the rod will swing the lever.

7. A transmission mechanism including a casing, a differential gearing cage mounted in the casing, a drive shaft projecting into the casing, pinions fixed to the drive shaft, beveled gears mounted for free rotation about the differential cage and meshing with the pinions, clutches movable into and out of engagement with the gears to lock them to the differential cage, shipper rings rotatably carried by the clutches and having diametrically projecting pins, a pair of shipper levers pivoted to the casing and operatively connected at one end with one pin of each shipper ring, a corresponding pair of shipper levers pivoted in the casing and operatively connected at one end to the other pin of each shipper ring, a link connecting the free ends of the first shipper levers, a link connecting the free ends of the second shipper levers, connecting means between the links, and means operatively joined with the connecting means for simultaneously swinging the links and shipper levers to move the clutches.

In testimony whereof I affix my signature.

OTTO H. GRUPE. [L. S.]